June 28, 1932.  J. O. SNYDER  1,864,867

PROTECTING AND COOLING MEANS FOR DYNAMO ELECTRIC MACHINES

Filed Jan. 31, 1929

INVENTOR
JAMES O. SNYDER
BY Roy M. Eilers
ATTORNEY

Patented June 28, 1932

1,864,867

UNITED STATES PATENT OFFICE

JAMES O. SNYDER, OF INDIANAPOLIS, INDIANA, ASSIGNOR TO FAIRBANKS, MORSE & CO., OF CHICAGO, ILLINOIS, A CORPORATION OF ILLINOIS

PROTECTING AND COOLING MEANS FOR DYNAMO-ELECTRIC MACHINES

Application filed January 31, 1929. Serial No. 336,346.

This invention relates to improvements in protecting and cooling means for dynamo-electric machines, and more particularly to combined ventilating, cooling and protecting apparatus for electric motors.

An object of the present invention is to provide improved means for readily converting an open type motor into a motor of enclosed type, without impairing the rating and efficiency of the motor, by the addition of such means.

A further object is to provide an enclosing member of improved form and construction which will serve, not only as an agitator to cause a current of cooling air to be passed over the conducting parts of an electric motor, but also as means for effectively preventing the entrance of dirt or foreign matter to the live parts of the machine, from the surrounding atmosphere.

A further object of the invention is attained in the provision of a combined housing and cooling member applicable to dynamos and electric motors; such member being formed of a relatively thin, inexpensive, sheet material, preferably metal, of a high heat conductivity.

Figure 1:
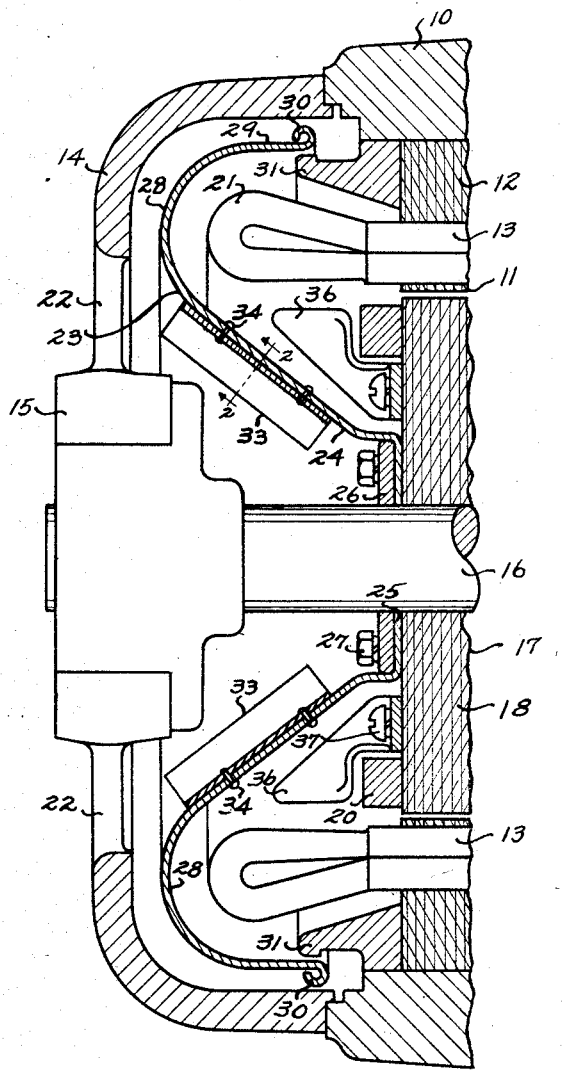
Figure 2:

Further objects and advantages of the present invention will appear from the following detailed description of an illustrative example thereof, and from the accompanying drawing, Fig. 1 of which shows a vertical, sectional elevation of one end of an electric motor equipped according to the present invention; Fig. 2 being a section transverse to Fig. 1, along line 2—2 thereof.

It has been long known in the art to provide for ventilation of electric motors and the like, by means of elaborately constructed fans and impellers, with related air channels, either internally or externally of the motor frame. While such devices are no doubt effective, they add materially to the cost of the completed machine, and the machine must usually be designed particularly for the reception of this elaborate extraneous cooling equipment. To the end of obviating the expense and space requirement of such equiment, it is a further purpose and object of the present invention to provide an efficient cooling and protecting means which may be attached to an electric motor of usual type, either at the time of manufacture, or by a user after purchase, with a minimum interruption of service for such an installation.

Proceeding now to the description of parts of the device as illustrated in the accompanying drawing, 10 designates, generally, an electric motor which may be of any conventional construction, and which is provided with a stator 11, and a core 12, which is provided with windings 13. The stator 11 comprises a part of, or is carried by and within the usual frame of the machine, having, in the present instance, end members 14 provided with bearing arms 15, in which may be fitted the motor bearings of the usual association with the shaft 16. Secured to, and in rigid connection with the shaft 16 is the rotor 17, comprising in the present example, a laminated core portion 18, which may be slotted in the usual manner to receive the rotor bars, (not shown), each of which is in turn secured in the usual manner to end rings 20 only one of which, for convenience of illustration, is shown.

As thus far described, the parts of the motor are or may be of conventional construction. As particularly pertinent to the present improvements to be hereinafter described, it will be noted that the windings 13, associated with the stator core, terminate in lateral extending coiled portions 21, this being the usual arrangement for windings of the general type illustrated.

Cooling of the windings and live parts is usually effected in motors of the type shown, by introducing air through spaces 22 in the end members 14, which air may be circulated in one end of the motor and out of the opposite end thereof, or in some cases, may be introduced intermediately of the frame and expelled from both ends of the motor, as is well known in the art.

The present improvements consist, in the case of a motor of the type described, in suitably mounting, by preference on the rotor of the machine, a disc like shield 23, preferably formed of sheet metal of a relatively high heat conductivity. The radially innermost portion 24 of the shield is shown as being of frusto-conical form, and provided with an annular flange 25, adapted to be disposed adjacent the rotor 17, and which may extend radially inwardly to the motor shaft. Securement of this cooling member 23 is effected in the present example by means of an annulus or collar 26, having an opening of substantially the shaft diameter, and which abuts the flanged portion 25 of the shield. The annulus or collar, and the shroud or cooling member are secured in place next to the rotor by means of bolts or the like 27, which may extend partly into, or completely through the rotor member.

The shield and cooling member 23 is extended radially outwardly from the shaft, and is turned inwardly upon itself to form a cupped portion 28 of arcuate section, which, as will be seen from Fig. 1, serves to overlie and partly enclose the coil portions 21 of the winding. The outermost portion of the shield is thence extended inwardly of the motor to form a substantially horizontal portion 29, terminating in a rolled or beaded edge 30. It will be seen that this beaded edge overlaps, in close proximity, an outwardly extending portion of the frame, such as a shoe 31. While the cooling member 23 is of sufficient rigidity to retain its initial conformity, it is still of sufficient flexibility to enable the edge 30 to be displaced sufficiently to form a reasonably close, running fit with the adjacent portion 31, thereby in effect forming a running seal between the portions 30 and 31.

As a means of agitating the air external to the shield, and for the purpose of increasing the radiation of heat by the shield, I provide one, or any desired plurality of corrugated or fluted portions 33, best shown in section in Fig. 2. This folded strip is shown as being of pleated or fluted construction, preferably with narrow, flat portions between the adjacent pleats or corrugations, the flat portions being intended for securement to the shield by welding, riveting, or the like, at the points 34. The effect of the folded strip 33 is to provide a plurality of tubular cooling fins, which serve as fan blades, in the manner of centrifugal impellers, and, at the same time, provide an increase in radiation area on the exterior surface of the shield 23.

While for the sake of simplicity of illustration and description I have shown only one end of an electric motor provided with the present improvements, it will be understood that the opposite end of the machine is, by great preference, to be similarly equipped, with the obvious result that the air inside the shield and about the rotor and windings, is effectively pocketed or shielded against contamination by, and intermingling with the air outside of the opposed pair of shields. To the end of forcing a circulation of air to take place within the cooling members 23, there being one on each end of the rotor, I provide fan elements or impellers 36 internally of the shield. The fans 36 are shown as being substantially L shaped in elevation, and secured to the rotor core by means of suitable screws or bolts 37. The obvious effect of the rotation of these fans will be to insure a complete agitation of air between the opposed shields 23, this enclosed air being cooled by radiation through the relatively thin sheet metal of each of the cooling shields, whence the heat is dissipated by the exterior agitating and cooling effect of the pleated portions 33.

The air outside of the discs or shields is in free communication with the outside atmosphere through the openings 22 in the end members. The described forced circulation of air on the inside and outside of the space defined by the shields, will serve effectively to cool all heating portions of the machine upon operation thereof through any normal range of operating speeds.

As being most suitable for the manufacture of the shields or discs 23, and related sheet metal portions, I prefer the use of copper or aluminum sheet material, or certain alloys of either of these metals, having the requisite heat conductivity.

In experimental use the device described has been found to be applicable to motors of existing design, and motors equipped in the manner described, have been found to be at least the full equivalent, so far as performance and characteristics are concerned, of the open type motor. The accessory parts of the present invention have further been found to protect such motors adequately and permanently from the loss of efficiency and necessity for service attention, incident to any substantial amount of foreign matter in the air.

I claim as my invention:

1. An electric motor including a frame, a rotor and a stator having windings associated therewith, a unitary protecting and cooling device for the conducting portions of the motor, the device comprising a shield of sheet metal, of relatively high heat conductivity carried entirely by the rotor, and formed inwardly of its radius into a partly conical structure, and having a portion of curved trend and section for enclosing said windings, and terminating in an outer portion having a running fit with a stationary part of the machine, whereby substantially to seal the rotor and stator, including the windings, against the air outside of the shield; and a structure corrugated to constitute a plurality of radiating and air-impelling fins, said structure formed separately from, and exteriorly carried by said shield.

2. A shroud element for cooling and protecting the live parts of an electric motor having a stator, windings associated therewith, and a rotor, said shroud element extending outwardly and adapted to be carried entirely by the rotor to enclose said windings and a corrugated annular member forming a plurality of radiating and air impelling fins said member formed separately from and exteriorly secured to said shroud element.

3. An electrical machine including a stator and a rotor, and a sheet metal cooling and protecting shield of unitary construction carried entirely by the rotor body and extending radially as a cone and having a reversely turned free edge to form a deeply cupped end cover for the ends of the current carrying portions of the machine, the outer free edge of the shield having a running fit with a portion of the stator frame structure, said shield having an annular corrugated member forming a plurality of radiating and air impelling fins secured exteriorly thereto.

JAMES O. SNYDER.